(12) United States Patent
Shortridge

(10) Patent No.: US 8,744,933 B2
(45) Date of Patent: Jun. 3, 2014

(54) PAYROLL PROCESSING, CERTIFICATION, REPORTING AND PROJECT MANAGEMENT SYSTEM AND METHOD

(76) Inventor: Douglas Maurice Shortridge, Napa, CA (US)

( * ) Notice: Subject to any disclaimer, the term of this patent is extended or adjusted under 35 U.S.C. 154(b) by 0 days.

(21) Appl. No.: 12/077,216

(22) Filed: Mar. 18, 2008

(65) Prior Publication Data

US 2009/0240607 A1 Sep. 24, 2009

(51) Int. Cl.
*G07B 17/00* (2006.01)
*G06F 15/02* (2006.01)

(52) U.S. Cl.
CPC ............................. *C06Q 40/12* (2013.01)
USPC ............................................. 705/32; 705/30

(58) Field of Classification Search
USPC ............................................................ 705/32
See application file for complete search history.

(56) References Cited

U.S. PATENT DOCUMENTS

| | | | | |
|---|---|---|---|---|
| 6,347,306 | B1 * | 2/2002 | Swart ............................... | 705/32 |
| 6,401,079 | B1 * | 6/2002 | Kahn et al. ...................... | 705/30 |
| 2004/0158512 | A1 * | 8/2004 | Dean et al. ...................... | 705/32 |
| 2007/0136156 | A1 * | 6/2007 | Seeley et al. .................... | 705/30 |

OTHER PUBLICATIONS

Prior art reference recently discovered via http://waybackmachine.org. Web site pages of software firm "Softwriters, Inc." Archived Feb. 5, 2005.
Prior art related reference recently discovered via http://waybackmachine.org. Web site pages of software firm "Points North Consulting, Inc." Archived Dec. 27, 2005.
Periodical article recently discovered. Mar. 17, 2006 press release by RedOrbit News and copyrighted by Duluth News-Tribune, Minnesota. Distributed by Knight Ridder/Tribune Business News. Article title: "Points North Buys Software Competitor: Technology: The Acquisition Should Add Jobs in the Duluth Office." Jane Brissett authoring journalist.
Prior art reference recently discovered via http://waybackmachine.org. Web site pages of software firm "Points North Consulting, Inc." Archived Jan. 29, 2008.
Prior art reference recently discovered via http://waybackmachine.org. Web page of software firm "Points North Consulting, Inc." Archived Feb. 18, 2008.
Prior art reference (possibly published prior to application date) recently discovered via http://waybackmachine.org. Web site pages of software firm "Points North Consulting, Inc." Archived Mar. 30, 2008.

(Continued)

*Primary Examiner* — Ryan Zeender
*Assistant Examiner* — Denisse Ortiz Roman
(74) *Attorney, Agent, or Firm* — Maginot, Moore & Beck LLP

(57) ABSTRACT

A computer implemented business method and process directed to enabling a public works contractor employer who contracts for work on one or more government agency public works projects or who contracts for work on concurrent private and public works projects, in a singlular or plurality of jurisdictions to process payroll on contract-specific bases in order to: generate certified payroll records in accordance with the currently applicable rules and standards for content and format required by a plurality of awarding body or enforcement jurisdictions and at predetermined intervals; provide alerts and reports allowing said contractor to anticipate compliance vulnerability and choose real time manpower adjustments for such management issues as apprentice/journeyman ratio; provide evidence of meeting and exceeding government objectives in order to establish a record and reputation of compliance; and generate reports for managing the assignment of personnel to enhance worker cooperation, spirit, and morale.

24 Claims, 4 Drawing Sheets

(56) References Cited

OTHER PUBLICATIONS

Prior art reference (possibly published prior to application date) recently discovered via http://waybackmachine.org. Web site pages of software firm "Points North Consulting, Inc." Archived Aug. 28, 2008.

Foundation Payroll Service, LLC, DBA PAYROLL4CONSTRUCTION.com Sales/Service Brochure Date: Mailed to Applicant Apr. 2, 2012 pp. 8 content, 1 pdf envelope (9 total pdf pp.)

Foundation Contruction Payroll Service Wayback Machine Archived Web Page dated Aug. 21, 2008 pp. 1.

Foundation Construction Payroll Service Wayback Machine Archived Web Page dated Jan. 23, 2010 pp. 2.

Payroll4Construction.com Wayback Machine Archived Web Page dated Dec. 30, 2010 pp. 2.

Payroll4Construction.com Wayback Machine Archived Web Page dated Feb. 7, 2011 pp. 2.

Foundation Software Wayback Machine Archived Web Page dated Oct. 29, 2007 pp. 1.

Foundation Software Wayback Machine Archived Web Page dated Feb. 17, 2009 pp. 1.

Foundation Software Wayback Machine Archived Web Page dated 2010.01011 pp. 1.

Tracie Kuczkowski for Foundation Construction Payroll Service Press Release—Reuters US (website) dated Sep. 25, 2009 pp. 2.

NPL submitted. Informational Brief prepared for Members of the Ohio General Assembly. Prepared by: Elizabeth Dominic, Staff Attorney, Reviewed By: Virginia McInerney, Research Supervisor. vol 126, Issue 2, Feb. 25, 2005 (pp. 16.).

Cornell University IRL Review. "Prevailing Wage Laws and Construction Labor Markets" by Daniel P. Kessler and Lawrence F. Katz. Source: Industrial and Labor Relations Review, vol. 54, No. 2(Jan. 2001), pp. 259-274. (17 pages).

Published Textbook Information Sheet. "The Economics of Prevailing Wage Laws." (1 page).

White Paper excerpt "Complex Worlds of New York Prevailing Wage" (3 pages).

Payday grid DOL (3 pages).

Miscellanious excerpts and complete sections various laws and regulations of different state prevailing wage jurisdictions. (308 pages).

Miscellanious payroll report forms from various jurisdictions. (25 pages).

Certified payroll record analysis tutorial from www.callcp.com website. 2005 Doug Shortridge. Place of publication: Petaluma, California (25 pages).

\* cited by examiner

PAYROLL PROCESSING, CERTIFICATION, REPORTING AND PROJECT MANAGEMENT SYSTEM AND METHOD

STATEMENT OF GOVERNMENTAL ASSISTANCE

Applicant hereby represents that no part of the subject invention or application has come about with the assistance of government funds or by virtue of a government program.

FIELD OF THE INVENTION

The present invention relates generally to core payroll processing and augmenting and support processing for reports generation specifically for the taxpayer funded public works sector construction contractor. Said contractor may be operating under a plurality of payroll periods while performing on a plurality of projects, publically or privately funded, for a plurality of public agency awarding bodies and/or private owners which may be governed by differing regulations and contract terms regarding reporting, reporting format and content, payroll period duration, and apprentice utilization, among other things. Additionally, the present invention will provide additional contractor's project management tools such as tracking, compiling, reporting, analyzing, planning, processing, certifying for regulatory compliance, payroll and man hours by labor classification and day, and payroll processing cost.

BACKGROUND OF THE INVENTION

Presently, in the field of government funded construction projects, also known as "Public Works"[1] (hereinafter so termed) contractors are required in a variety of jurisdictions to pay mandated minimum wages, also known as "prevailing wages", based on classification of work type and other factors such as geographic location of the construction site, and to provide certified payroll records (hereinafter "CPRs"), among other things. When submitted by the Public Works construction contractor, CPRs are intended to serve as prima facie evidence of the wages paid and any fringe benefit contributions made, to or on behalf of each worker on the project, broken down by craft, type, or classification of work, per hour, and per day, along with various information items related to the project, the awarding body, and the employees working thereupon (herinafter "CPR-criteria").

[1] For purposes of this specification, the term "Public Works" is meant to describe work done by a non-governmental entity contractor employer that performs construction, alteration, demolition, installation or repair work consistent with California Labor Code §1720 et. seq., United States Code Davis-Bacon and Related Acts Title 40 U.S.C. §3141 et. seq., and all other similar laws and regulations of any states and any political subdivisions therein. The term "Public Works" as used herein is not to be considered the same as the term as used, for example, as the title name of Title 21 California Code of Regulations which governs such things as the State Architect's Office and the Department of Transportation.

Complicating the matter, depending on the awarding body governmental entity; e.g., municipal, county, state, or federal, the format and specific content requirements of CPRs can vary widely from jurisdiction to jurisdiction and there is no universally accepted format or "gold standard" as to the CPR-criteria content of CPRs within the sector. The number and classification, and the method or basis of accounting of these CPR-criteria can vary with significance.

Often, as previously referenced above, a contractor may have work in more than one jurisdiction and therefore be subject to different obligations regarding such things as payroll period duration, payroll detail reporting, and apprenticeship employment requirements. And because much of the pertinent compliance information is readily available online nowadays, there is ever increasing pressure on Public Works contractors, and the awarding bodies commissioning the projects to be cognizant of their respective duties to ensure that proper wages are paid and correct payperiods are used, among other things. Due to technological advances and increasing ease of information gathering and sharing, the standards for Public Works payroll processing, reporting, and enforcement are rising, albeit inconsistently. Distinctions between, and the evolution of, the rules of different jurisdictions are becoming clearer to interested parties including contractors, enforcement authorities, and awarding body agencies due to greater awareness and availability of the pertinent information via the web.

Yet, often it is so within a given jurisdiction, there is no mandate by statute, regulation, or even an agency-generated written instruction or policy regarding the specific elements of payroll CPR-criteria which ought to be reported. Indeed it is difficult to find any CPR format in any jurisdiction which is not susceptible to question or argument as to that which constitutes "best practices" of data configuration and CPR-criteria content because there is such a lack of specificity in the policies, instructions, or law. As previously stated, there is essentially no single standard for CPR-criteria content across all public works in general. In fact, when all CPR formats are combined from all jurisdictions, there are approximately seventy specific elements of CPR-criteria to list. Yet no single jurisdiction requires more than approximately forty-four of these total elements of CPR-criteria to be reported on their version of a CPR. Many jurisdictions require far less than forty-four. The various CPRs are also known in California as "Public Works Payroll Reporting Form A-1-131", in Illinois as "Certified Transcript of Payroll", within the New York School Construction Authority as "Certification of Payroll", under United States Dept. of Labor jurisdiction projects as simply "Payroll" (Form WH-347), and are called by other names elsewhere. However, all the forms and formats, either as integrally complete or in combination with other forms are borne of substantially the same basis of intent and purpose.

Admittedly, a variety of CPR-criteria elements are fairly standard or commonplace in that virtually all payroll of any employment sector must calculate the basic discrete elements, such as: wages, federal, state, and local income tax deductions, federal social security and medicare contribution deductions ("FICA"). For purposes of this disclosure, these standard aspects of payroll processing, however actually accomplished by means of a data processing program, may be referred to as the "core" level of payroll processing. However, it is only in some cases that the elements of core payroll processing employer payments or contributions known as "fringe benefits", such as health insurance premiums or pension fund contributions or other payments for such things as training fund support, are required as elements of the aggregate CPR-criteria to be shown under the rules of a given jurisdiction. Other times, for example as in the case of the Federal Government form WH-347, no breakdown is required for fringe benefits if a certified statement is submitted declaring all proper payments have been, or will be, timely made. In other jurisdictions, these "fringe benefits" may be reported on a separate report as discrete line items showing an hourly-rate to be paid per fringe benefit category for the particular type or classification of work. This report is to be incorporated by reference into each CPR as a separate "fringe benefit statement". Yet even when the required report criteria includes all the aforementioned, there is often a lack of governmental mandate as to how these amounts must be accounted for in relation to such things as the pay period gross wage or the hours worked for the particular public works project. Furthermore, it is required in some jurisdictions that the gross amount earned by the worker on the subject public works project be listed but that also the gross amount earned by the worker for all work during the report period be shown. Also, some jurisdictions require on the report the sex and ethnicity of the individual workers. Yet another disparity between jurisdictions regarding CPR-criteria is whether names, addresses, and social security numbers of workers shall be shown or remain as confidential information. Finally, in some cases the hours worked on all work assignments by the worker during the pay period, regardless of whether or not the worker delivered the work upon the subject CPR project is required. As previously stated, often a contractor may have work in more than one jurisdiction and be subject to different obligations regarding such things as payroll period duration, format of payroll records reporting, and apprenticeship employment.

As described in the preceding paragraphs the standard for CPR format, configuration, and content is not uniformly established. In fact the locally required format may change at any time in any particular jurisdiction depending upon such things as the views of the authority or administration regarding regulation of wages or which portions of the elements of any given payroll breakdown are most useful in the oversight process. The realm of Public Works payroll reporting encompasses everything from the rudimentary to the highly specific and much in between these extremes. This variance causes ongoing confusion, dispute, and inefficiency among participants in the sector whether they be contractors, workers, governmental awarding bodies, union compliance or government compliance personnel or the public in general. Because of these conditions there is no "gold standard" yet established along these lines.

What is needed then is a method of processing payroll for Public Works contractors which has the capability to create CPRs of content of CPR-criteria and in a format which meets or exceeds any given jurisdiction's standards of that day. Furthermore, since possibly an individual contractor, and certainly a payroll service bureau processor, will likely have the task of preparing payroll reports under a plurality of unique jurisdictional mandates, what is needed is a system which can efficiently process payroll and generate reports tailored to each case during the same payroll period and report period doing so concurrently on a "multi-jurisdictional" basis.

A variety of Stand Alone core payroll processing computer programs or engines, (hereinafter "SA's") such as Quickbooks®[2] and others have provisions for keeping track of and reporting certain of the more standard criteria found in day to day payroll accounting and reporting common to any employer, but do not have the capability to process the more particularized criteria common to governmental or Public Works projects requiring payroll certification.

[2]Quickbooks is a registered trademark of Intuit Software, maker of the popular Quicken and Quickbooks personal and business financial tracking software products.

Since the 1950's[3] when companies have looked to cut overhead costs or "borrow" or learn from "best practices" of other companies' experience, the trend to "outsourcing" various overhead functions has led to the emergence of core payroll service companies or bureaus (hereinafter "PSB"), which have developed computer processing engines to manage the payroll tracking, computation and function of check issuance, thereby relieving the contractor of internal overhead, variable expenses which may change over time, and for which a reduction in personnel may be achieved by turning such a traditional accounting function over to a company having specialty in such services. These core PSB's are subject to an additional facet of complexity as they perform their function for a number of clients (contractors and non-contractors alike). At present although capable of generating many types of management assistance reports of many configurations based on the data inherent in most, if not all legally recognized employment sectors including Public Works contractor sector payroll, and although also capable of generating CPRS in compliance with only a very limited number of jurisdictional regulations, PSB's cannot fulfill all possible individual governmental entity requirements for CPR criteria on a broad range of Public Works projects, and further, they perform almost no function which could assist the contractor in managing the application of its labor force pro-actively to assure continued compliance on projects. Often, the only option provided a contractor is to operate on a weekly payroll period and accept Federal Public Works CPR-criteria rules as the only option, regardless of whether or not more stringent CPR-criteria are required by the awarding body jurisdiction in which the contractor is involved, and regardless of the potential of being called to task at any time for fully compliant reports with the full volume of that particular jurisdiction's CPR-criteria in it's precisely organized official format.

[3]Industry Giant ADP began in New Jersey as an outsourced payroll processor in the early 1950's.

Another fundamental cause of complexity stems from not only the aforementioned variations in CPR-criteria requirements but the fact that many contractors may perform work on multiple regulated projects at the same time, and may also concurrently work on non-regulated Public Works or privately funded contracts or other work assignments with the same labor personnel, even during the same payroll period such as driving a vehicle to and from the jobsite. This means that multiple calculations involving varying time and hourly rate of pay may apply for one employee of a customer who has worked on Public Works and private sector projects during the same week and even the same day. PSB's which are either "regional market based" or "national market based" and SA computer programs and systems currently are not set up to meet this complexity and require either custom computer applications maintained internally by the contractor or must be manually tracked and reported by same in order to meet government requirements for creating and submitting CPRs on Public Works projects when CPRs are required at the highest CPR-criteria content standard, while maintaining the flexibility to distinguish between public sector and private works applications of labor.

Because of the complexity faced by regional or national market PSB's in providing specialized tracking and reporting for contractors engaging in both public and private projects and the generic nature and limitations of the aforementioned SA's, many contractors have found it necessary to resort to the implementation of costly and sophisticated payroll processing systems in an attempt to satisfy the regulatory requirements for certifying payroll reports or maintain a costly staff of accounting and payroll personnel to meet their reporting obligations. In many instances, contractors are deficient or inaccurate in their tracking and reporting of necessary CPR-criteria, even in some cases, dummying up reports and certifications in order to satisfy regulatory mandates and thereby acting unlawfully.

Unfortunately, many of the sophisticated systems which do exist in the field today fail to accurately create CPRs which may be certified by the contractor, or to create other management reports for such things as apprentice-to-journeyman utilization and ratio at the necessary CPR-criteria because: 1) a comprehensive understanding of the legislative intent of the statutory requirements and the administrative intent of the regulatory mandates and contractor requirements for the adherence to same, which is highly specific to the Public Works sector, is typically not found in the knowledge base of the executive business leaders, accountants and programmers who create standalone and customized payroll processing engine systems: 2) variations in the opinions of government administrators even in the same jurisdiction related to rule interpretation as to such things as CPR-criteria, as well as regulatory and rules changes made by the various jurisdictions quickly render the SA's and customized programs of PSB's and large contractors inadequate; and 3) most if not all SA's do not provide reporting functions which are generally satisfactory to the reporting requirements and standards of the Public Works construction contracting prevailing wage law and regulation governed employment sector. The contractor which maintains its own payroll calculation and certification or reporting functions must continually train and maintain a knowledgeable payroll and accounting staff and its computerized payroll system at high cost and subject to significant risk if such maintenance of staff and systems is deficient. Such a burden increases general and administrative costs thereby making some contractors less competitive in the marketplace. What is needed is a system or method to support and augment local, regional, or national market PSB's and SA's in the core payroll processing of varied hourly rate labor classifications and other aspects of payroll processing generally unique to the tax-payer funded Public Works construction contractor employment sector, doing so in such a way to maintain adherence to the varied and ever changing regulatory schemes for such things as CPR-criteria at the same time providing for the calculation, tracking, and reporting in certifiable form as needed, various payroll elements and aspects pertaining to multiple employees of contractors working on a combination of Public Works and private sector projects.

U.S. Pat. No. 6,401,079 B1 issued Jun. 4, 2002 to Kahn et al. describes a System For Web-Based Payroll and Benefits Administration. This reference implements and enforces compliance with a wide variety of core payroll tax-related and employment-related rules across a variety of governmental jurisdictions relating to such core payroll issues as overtime pay, benefit limits, payment frequency and scheduled tax reporting requirements. The system is described as capable of receiving electronic updates automatically to ensure compliance with current rule changes related to core payroll processing. It also states that employers may set up custom policies and the systems can review and validate employees' paychecks as well as print paychecks or submit them to a back-end payroll service. In this reference, a substantive description of the various SA systems, enterprise-level human resource information systems ("HRIS"), and the problem of integrating payroll system functionality with that of a centralized payroll service are discussed.

As pointed out by the Kahn reference, SA programs are difficult to update on a frequent enough basis to assure continued current compliance with regulatory changes. While such changes can be issued by the software company's updating and maintenance departments, the sophisticated systems described above also require extensive reprogramming in order to update compliance factors to be applied to the appropriate criterion.

Kahn purports to provide full-featured payroll system functionality in a single embodiment on both the client and server side with a "robust user interface via a standard web browser." The system includes a centralized database on the server side to provide constant access to raw data to both the back end payroll service and to the system interface.

In today's world, through the use of relational databases database management systems, and related programming architectures, structures, and methods which create links between various tables by certain common or specialized fields, the same may be accomplished with relative ease.

Kahn further provides custom reports which the system will generate to the appropriate party at "specified reporting interval[s]". However, there is no disclosure in Kahn regarding the non-cutomized, "turn key" Public Works related complete CPR-criteria reporting functionality contemplated in the present invention.

When the employee works on a mix of public or private contracts, or for a plurality of contracts, the employee payroll elements must be treated on an aggregate basis of all work and pay for the pay period, and further brought into a weekly basis to meet the format requirements of most jurisdictions regarding CPR-criteria, and yet further, also be treated on a project specific basis in order to fully comply with the requirements for CPR-criteria for the subject project or projects.

What Kahn does not appear to provide for is the calculation of various when a multiplicity of projects are worked upon by the same employee during a given pay period, and which may also fall under one or more given weekly-basis CPR reporting period which will require the reporting of various portions of the total pay period's payroll criteria.

What is needed then is a Public Works construction sector focused payroll processing, tracking and reporting system and method which addresses, by contract (or project), the payroll elements such that reporting may be complete in CPR-criteria and certifiable based on the requirements of each individual project (contract or subcontract) for a plurality of awarding body jurisdictions. Furthermore, said system and method should be capable of supporting integration with or supporting augmentation of both PSB's and SA's.

Furthermore, to aid a contractor in analyzing whether it is supplying the correct ratio of journeymen to apprentices for a given contract (rather than as in Kahn which provides custom reports only at specified intervals), real time work type or classification ratios should be reportable to said contractors with comparisons to required limits or thresholds to allow the contractor in real time, to increase or decrease manpower by work type or classification as necessary to achieve compliance, and most importantly, to avoid non-compliance.

In a system like the Kahn system, in order for a contractor to be able to so project manage, it would be necessary for the system to print out certain CPR-criteria such as labor classifications and the contractor would need to interpret said results with an eye toward desired ratios for the entire contract.

Kahn does not appear to teach any such project management function. Much of the customized features pertain to financial items such as retirement, direct deposit, pension plans, etc. It does not appear that Kahn contemplates any kind of productivity or classification ratio analysis which would allow a contractor to assure continued compliance with a specific contract.

To have enhanced utility for a Public Works contractor, a payroll processing and reporting system, whether an internal manual system, PSB or SA, should provide means for interpolating or extrapolating real time compliance with regulatory requirements. In order to accomplish such analysis, it is necessary to have a means to input and compare the primarily non-financial overall manhour targets by labor classification for meaningful comparison with actual work performed. Granted, one could track the amount spent by classification to arrive at a specific ratio, but the amount which comprises the denominator in any such calculation is still fundamentally a function of the overall number of target manhours to be allowed or limited. The prior art does not appear to demonstrate in standalone or other dedicated payroll processing programs or systems adequate provisions for tracking the progress of labor classifications against contract targets necessary in meeting minimum apprentice employment requirements, reporting or certification.

What is needed is a system which contains contract specific journeyman and apprentice hour ratio and/or limits in the form of manhours planned or contracted for, in order to alert a contractor when labor classification apprenticeship to journeyman ratios are vulnerable to slipping out of compliance and to enable project management decisions to be made to assure concurrent, continued or final compliance. Such additional system and method would need to include the capacity for ongoing updates for change orders or extra work approved for each project (contract).

Along the lines of reporting vulnerability is the opportunity to also report and take credit for exceeding compliance in such a way to show the management of the contractor in a preferred light to a government agency for demonstrating better results for using for example, minority workers, disabled, and other classifications of workers that the government has indicated it desires to employ on public projects. Such reporting may be used to place the contractor in a better competitive position in future bidding or contracting opportunities with said agency, or may be touted in pre-qualification rounds or in the bid offering submitted to a governmental agency for preferred consideration or evaluation.

What is needed then is additional classification means to identify preferential groups or other criteria to be reported by contractors to demonstrate and communicate an improvement on the objectives of a government agency involved letting contracts.

Similar to the immediately foregoing preference "success" reporting, it is incumbent on the part of contractors to also spread projects across his employee base such that each employee has an opportunity, where possible, to work on particularly good projects, thereby increasing worker morale. This morality factor has significant impact on employee retention, productivity, and soft impacts such as employee spirit and cooperation for example, when requested to work overtime or switch tasks, jobs, or work locations, the employee having confidence that the employer will treat the employee with fairness and integrity. Such workforce morale provides distinct benefits to employees as well as perceived value-added dimensions to the contractors client and customer base, and is believed to contribute to employee productivity.

What is needed then is tracking and reporting means for providing capability to an employer/contractor to manage his workforce over time across his contractual commitments so that distribution of preferred work within the company occurs under a method of objective fairness.

The United States Patent and Trademark Office granted U.S. Pat. No. 6,850,905 B2 on Feb. 1, 2005 to Kelly for a MODULAR SERVICE PAYROLL SYSTEM.

The Kelly reference provides a payroll system and method for processing payroll for employees for work during a pay period on any of one or more projects. A debit account is provided for the employee in order to allow for "extra time" which the employee works but is not billed to the customer, as well as inexcusable extra time, each potentially being offset to the account of the employee. A "company factor" is also established for manipulation as a function for a "unit rate compensation amount" allowing management review of productivity and overall efficiency of a department of the company.

While these types of measurements are helpful in a general management sense, as taught, the Kelly reference does not lend itself to the realm of contract compliance for Public Works projects. In fact, the nature of prevailing wage laws and provisions prohibit the type of system taught by Kelly because Public Works prevailing wage laws do not comport with schemes such as "piece work" or the crediting back of time on employee accounts and are thereby fundamentally in conflict with such payment policies.

While most contractor based payroll is reported and paid on a weekly basis, some other bases do exist for payroll based primarily on labor hours expended. It is most common in the industry to pay construction workers at the end of a calendar week, or a weekly pay period. Other pay period exist such as bi-weekly (every two weeks), semi-monthly (twice monthly), monthly, etc. It is quite uncommon to have a pay period which would be less than one week, however, it is true that in the case of termination, a worker is entitled to receive his or her pay immediately, or within a specified time after termination, and in fact, some contractors are prepared to pay an employee upon termination a rate for the day or hours worked up to and including the last shift worked.

What is needed then is a method which allows complete flexibility in the reporting of payroll on weekly-basis CPRs (or any other reporting period required by a given jurisdiction), in which the actually calculated core payroll may also be based on variable pay periods, from the hour, to the day, to a standard weekly pay period, a standard bi-weekly period, semi-monthly period, and even a longer period where allowed while maintaining the ability to create a weekly-basis CPR regardless of pay period duration.

Also needed is a method to track, manage and report employee work on a plurality of projects integral to the compliance reporting and management of workers in at least a partial government setting. This is acutely necessary when more than one contract has time applied against it in the same pay period for the same worker or workers.

Other companies or products which currently provide Public Works contractor-focused payroll systems of which Applicant is aware include:

Sunburst Software, an add-on to primary core payroll software processor Quickbooks®, in which the SA desktop user enters data prior to core payroll processing on a payroll report form interface. Sunburst's product then combines the primary core payroll processor's information with job specific criteria for a certified payroll record, or "CPR." However, the added reporting functions which will aid the contractor in changing course during the contract are not included with the Sunburst product, and the real time, daily and, more specifically, hourly nature of reporting and tracking elements over a multiplicity of contracts for a single worker as well as tracking classification-specific hours accrued against estimated hours either do not exist, or are insufficient to meet the various management needs as articulated above for today's Public Works contractor. In addition, the Sunburst Software system must be individually customized by the programmer to match with any given jurisdiction's standards of the day for CPR-criteria (i.e. not all configurations and elements are available to the contractor through the SA software itself); and American Contractor, a product intended for large contractors which treats an inordinate amount of functions for the contractor from estimating, cost tracking, payroll, company accounting, material purchases, project management and other business and financial matters.

For the contractor who primarily needs a product to satisfy simple certified payroll reporting at, or greater than, any given jurisdiction's possibly unique standard for the elements of same, and real time labor hour management of its relevant contracts, the product is over-capable and seriously cost prohibitive. It is essentially an "all or nothing" commitment. More applicable to the construction business on a seriously large scale, the product is simply a vastly more complex solution than required and the amount of cost, training and time required to become familiar enough and to continue using the product would not be cost or time effective for the anticipated specialized independent government contractor which does not want to run his entire business with such a huge and expensive system, and only needs to track and report labor within regulatory requirements according to specific contracts; and Paychex "Preview" core payroll processing system which will only create reports with CPR-criteria consistent with Federal Public Works laws (WH-347 form) and not for instance State of California version of CPR (A-1-131). The Paychex "Preview" core payroll processing engine system is also limited to a weekly basis pay period when a contractor wishes to utilize the Federal CPR report function on their payroll.

What is needed then is a method and system which is cost-effective, "user friendly", highly flexible and comprehensive as to variable data element and payroll period configurations, which renders a focused solution to provide complete CPR-criteria certifiable forms as required locally or regionally by government contracting regulations and furthermore, is capable of delivering substantive management supporting reports enabling the contractor to effectively manage his workforce as well as to pro-actively plan for and assure contractual compliance.

SUMMARY OF THE INVENTION

Applicant's business method and system is directed to enabling an employer who contracts directly (as prime contractor), or as a subcontractor (at any tier of contractual hierarchy) under a prime contractor for work under one or more government agencies (jurisdictions) for one or more Public Works projects, or who contracts concurrently on several multi jurisdictional private and Public Works projects to process core payroll in such a way as to: generate CPRs which meet or exceed the CPR-criteria requirements of any given governmental agency jurisdiction mandate or policy; provide alerts and reports allowing said contractor to anticipate compliance vulnerability and choose real time manpower options; provide evidence of meeting and exceeding government objectives as well as managing the assignment of personnel to enhance worker cooperation, spirit, and hence, morale.

The invention comprises in part a core payroll processing augmenting and supporting method, a system, a set of related data tables or stores for processing payroll for workers employed by construction firms who contract at least in part with government agencies, or who subcontract under prime contractors at any tier of contractual hierarchy who contract at least in part with government agencies for Public Works project work, where said contracts are subject to jurisdiction-specific rules, regulations and statutes pertaining to payroll elements such as the payment of minimum prevailing wage by labor classification, the regular submission of reports which contain the jurisdiction-specific CPR-criteria on the reports, and in some cases minimum apprentice to journeymen employment ratios, and may require contractor contributions into training funds in addition to other disbursements or deposits typically determined by the number of man hours expended on any given contract.

It is an object of the present invention to augment and support the core payroll process to the degree necessary, such that at least portions of the raw payroll related input data from the contractor end-user is initially, sequentially, and/or simultaneously processed, and core payroll process output data is received, in order to provide data with such completeness which is employee specific, classification or work-type specific, time and day specific, and project specific such that calculation and reporting of all payroll and regulatory elements applying to employment of workers on the specific project may be accurate, complete and certifiable, and in compliance with whatever the jurisdiction for that particular project requires in core payroll processing and CPR-criteria and any other Public Works-specific documentation or reports, at, or greater than, the jurisdiction's standard, while still being priced in such a way to be efficient for all parties.

In the preferred embodiment of the present invention, said data would be processed in a system of relational database tables, such as by utilizing SQL software, containing all appropriate employee information as well as pertinent regulation and project specific data required of each jurisdiction for which the invention is programmed for applicability for completion of proper CPRs in said jurisdiction(s). Provision of such data will allow all standard payroll calculations to be generated for normal core payroll processing and subsequently capture informational results back to Applicant's system for additional processing and generation of CPRs and specific project management tools associated with hours and classifications of workers.

In computer programming, APIs, (Application Programming Interfaces) and ABIs (Application Binary Interfaces) are known abstractly as programmed computer readable instructions, and other data flow pathways for computerized processes which allow data to be passed between discrete programs or program components to achieve some useful purpose. Currently Wikipedia defines API as; " . . . a specification intended to be used as an interface by software components to communicate with each other . . . ", and defines ABI as; " . . . the low-level interface between a computer program and the operating system or another program . . . ". Applicant's add-on supporting and augmenting application and the primary processing core payroll processing application to which applicant's system is joined may require a configuration within this broad computer programming field abstraction which is well known in the art. Some forms of APIs and ABI's include web-based or direct interface. As is well known in the art, API's and ABI's are supported to allow other software developers to produce applications for use in conjunction with other applications for a variety of functions. For example, a directly connected "bolt on" system might require a programmed set of instructions which allow the core payroll system to "talk" to the supporting and augmenting system of the present invention. Or, in another example, a "cloud API" might be required to join the programs in a cloud-based, or cloud-supported, system. Finally, if a secure server FTP or other similar input/output secure system is required, an API or ABI which allows for web connection of the two systems could be utilized. For purposes of this disclosure the terms "API" and "ABI" are meant to describe any means of connecting together the two separate systems of core payroll processing engine and the present invention.

It is a further object of the preferred embodiment of Applicant's invention to provide data tables which contain overall contract ratio or limit data in the form of man hours planned or contracted for, in order to alert a contractor when labor classification compliance ratios, such as minimum or maximum apprentice-to-journeyman hours ratio requirements for a specific project, are vulnerable to slipping out of compliance and to enable project management decisions to be made to assure concurrent, continued or final compliance upon completion of the project.

Therefore, a table is provided which allows for a variety of labor classification and planned manhour information to enable the calculation of various limits and ratios which are relevant to assure compliance with such items as Journeyman/Apprentice ratios, etc. Such additional information would need also to be updated to reflect similar reporting for change orders or extra work approved for each contract. Running tabulations based on increased planned hours totals for original contract scope plus change orders estimates or finally agreed hours would be utilized by Applicant's system to maintain the integrity of such limit or ratio reporting as the subject project progressed through time toward completion.

Such calculations can also be utilized to provide the employer contractor with alerts such as final opportunities to make adjustments to the allocation of journeyman or apprentice hours in specific labor classifications on a specific project thus enabling the employer contractor to go beyond the payroll processing function toward the project management function to assure real time or current, future or final compliance with regulatory mandates by specific Public Works project contract.

It is a further object of the present invention to provide the contractor with means to demonstrate a history of operating on Public Works projects with high standards of labor and apprentice utilization compliance which may be useful when applying for pre-qualification status, bonding, or other potentially important business concerns of a similar nature.

It is also an object of the present invention to track, manage and report employee work on a plurality of projects integral to the compliance reporting and management of labor working on private and Public Works projects. This is accomplished by linking the employee data with the contract data by a simple entry on a timesheet, for example. When a manhour for a particular employee is stated as having been expended on a particular task code related to a particular contract, that unique manhour creates a link between the contract table and the employee data table thereby enabling the system to distinguish that employee's work regardless of contract, but with respect to each contract, and inclusive thereof. It is further possible by information in the employee table to relate to multiple labor classifications defined or included in the contract table to allow any worker to be billed against the appropriate contract according to the correct labor classification.

It is a further object of the instant invention to provide capability to an employer/contractor to manage his workforce along with his ability to track labor classification, and certify compliance with contract-specific regulations. By linking the employee data tables with the contract data tables, management can track the number of manhours expended by employee on each contract or even more specifically, by class or type of task, thereby providing the necessary information to facilitate fairness in workforce assignment, thereby increasing employee morale. Such management techniques can even be utilized to provide incentives or stimulate competition in the workforce to be rewarded with highly desirable assignments.

It is an additional object of the present invention to provide a cost efficient and user-friendly solution for employers required to comply with Public Works required payroll reports which are jurisdiction specific as to content and format (CPR-criteria). By using relational database methods to integrate with standalone or payroll service bureau core payroll processing systems, doing so without creating unneeded processing capacity integral to these systems which also may be used simultaneously for other employment sector payroll processing, Applicant's process improves significantly the field of art.

It is a further object of the present invention to allow the user to generate reports which illustrate a pattern of compliance with Public Works payroll law for purposes of development of good reputation. For example, this could be utilized when application is made under a formal awarding body pre-qualification process for prime contractors and/or subcontractors, or in another example, utilized in the management of a prime contractor which may require the selection from two or more specialty subcontractors a preferred subcontractor said management may view the selected subcontractor's historical "pattern of compliance" favorably and therefore include the selected subcontractor on a list of "pre-qualified contractors", thereby enhancing the prime contractor's overall offering.

Similarly, where a labor union and a contractor are interested in negotiating a contract, for a variety of potential reasons, the two may find useful in the negotiations an historical pattern of compliance along the lines of payroll rules and regulations. Also, where a contractors' association may wish to rank, measure, or represent that its members meet or exceed certain standards of compliance with prevailing wage laws, apprenticeship ratio performance; or, illustrate that high compliance standards are regularly met in order to attract the most qualified and competitive workers, such information and historical data has important significance. Another example of the import of such reporting would include a bonding company's interest in evaluating the risk profile of a Public Works contractor it may be considering as a client. A variety of reasons all of which are not contemplated herein may exist which derive value from the ability to confirm the compliance and other operational history of a prime or subcontractor. Applicant's method of measuring and reporting such historical compliance and operational standards goes beyond the prior art to a new level of utility in its field.

It is also an objective of Applicant's invention to provide its benefits to the contractor in a cost effective and efficient manner.

There are at least two primary scenarios where the use of Applicant's invention would financially benefit a PSB and thereby, its clients.

The first is a "contractor only" payroll service where only contractor clients are served. In this scenario contractors may exclusively work on Public Works projects, may exclusively perform private contracts, or may perform work on each type of contract.

In one embodiment of Applicant's invention, pricing for such a service might include a one time setup fee with a low, continuing fee assessed for each work hour processed, or in the case of very large projects, a declining hourly assessment. One way this might be simply illustrated includes: Contractor A wins a new project. Contractor A pays a one time $250 job setup fee to a payroll service bureau. The fee is in at least some part responsible to cover the costs of inputting required contract and employee information necessary to provide minimum certification and reporting requirements. Contractor A provides all such information about the project which is entered into the system by the service bureau. This information is essential in order to allow job-specific reports to be generated and so that the system may correctly allocate "per-project" prevailing wage costs such as actual wages paid, insurances, fringes, training contributions and the like. After job "set up" the more applicable hourly assessment is appropriate to recover the cost of normal payroll processing along with a reasonable profit. Such a payment method avoids overcharging a contractor as in the case of a fee per manhour only basis, which, after setup costs are realistically liquidated early in the project, continues to charge on an hourly basis at the same rate, truly at some point overpaying the actual setup costs It does not take much sophisticated arithmatic to conclude that for a contract involving a significant number of man hours, the assessment based on work hours processed may find the contractor paying the true setup cost many times over in comparison to the above initial scenario involving a set up fee and lower "hourly" assessment.

The above scenario may be contrasted with a non-Public Works job having a lower one time setup fee; e.g., $100 setup and then an appropriate charge per manhour. The setup fee is cheaper because there are no certified payroll report requirements, but he processing is still complex because it intersects with the processing of payroll for all of the contractor's projects and the gross pay, deductions, and fringes are all still required to be calculated and processed.

For very large projects, as in the first scenario, a setup fee may be charged with a declining per hour processed assessment to further prevent excess charges for payroll processing which by virtue of the size of the total number of manhours expected to be expended will continually rise. The lowest assessment in the end would truly reflect the true cost of payroll processing including a profit margin.

For the PSB which wants to add Public Works contractors to its stable of clients, another embodiment of Applicant's invention provides for an "add on" billing feature employing an established "per check", or "per report" (e.g. 1099's, federal 942's, W-2's, etc.) fee based upon which all payroll service clients are billed. When a contractor client is involved in a Public Works contract, the contractor may instead or in addition pay the payroll service a "per CPR", or "per hour", fee. The fee would reflect a minimum threshold cost recovery as in the initial scenario above, but is more directly tied to the number of reports required, again efficiently charging for necessary payroll processing without overcharging the client.

The advantage of Applicant's "per hour billing" mode is in its utility for contractors who are in a very special type of market; i.e., the Public Works arena, the private work arena, or a combination of the two, and have an incentive to price any overhead fees directly onto its estimate of the project being bid. If the contract is not won, the cost is not incurred. If the contract is won, the cost is directly accounted for in the labor burden category and the cost to the government agency is known to be appropriate and at a rate commensurate with the amount of labor time applied without concern for being overcharged for the extra payroll processing service. Whereas the first-discussed setup fee scenario enables both the contractor and PSB to capture appropriate fees necessitated by required reporting, it does not penalize the contractor who performs small contracts where the use of a per hour billed price would be disadvantageous. As well, the per hour billing method allows the cost of a larger contract to be spread out over the length of the contract (measured by the expenditure of labor hours) with no heavy up front charge necessary for smaller contracts.

In accordance with the capabilities of Applicant's system, a fee structure driven essentially by the number of labor hours processed without significant setup or other fees would be possible where warranted or desired by the PSB client or SA user, and usable by either PSB's with a mixed client base or a client base specifically targeted to contractors.

In summarizing, Applicant's invention is designed to: augment and support a core payroll processing system in accordance with the requirements of extensive Public Works construction contractor payroll processing and reporting rules regarding CPR-criteria and in compliance with company specific policies and provisions and specific to various governmental jurisdiction requirements and needs; provide specific reporting to alert the employer in order to enable project management decisions to be regularly made real time to assure continued, future and final compliance with contract requirements; to demonstrate the attainment and even exceeding of certain government agency objectives in the prosecution of work; all the while providing meaningful data to allow the employer to manage its workforce to ensure high worker morale and cooperation all in a cost-effective, focused solution.

DETAILED DESCRIPTION OF THE INVENTION

Figure 1:
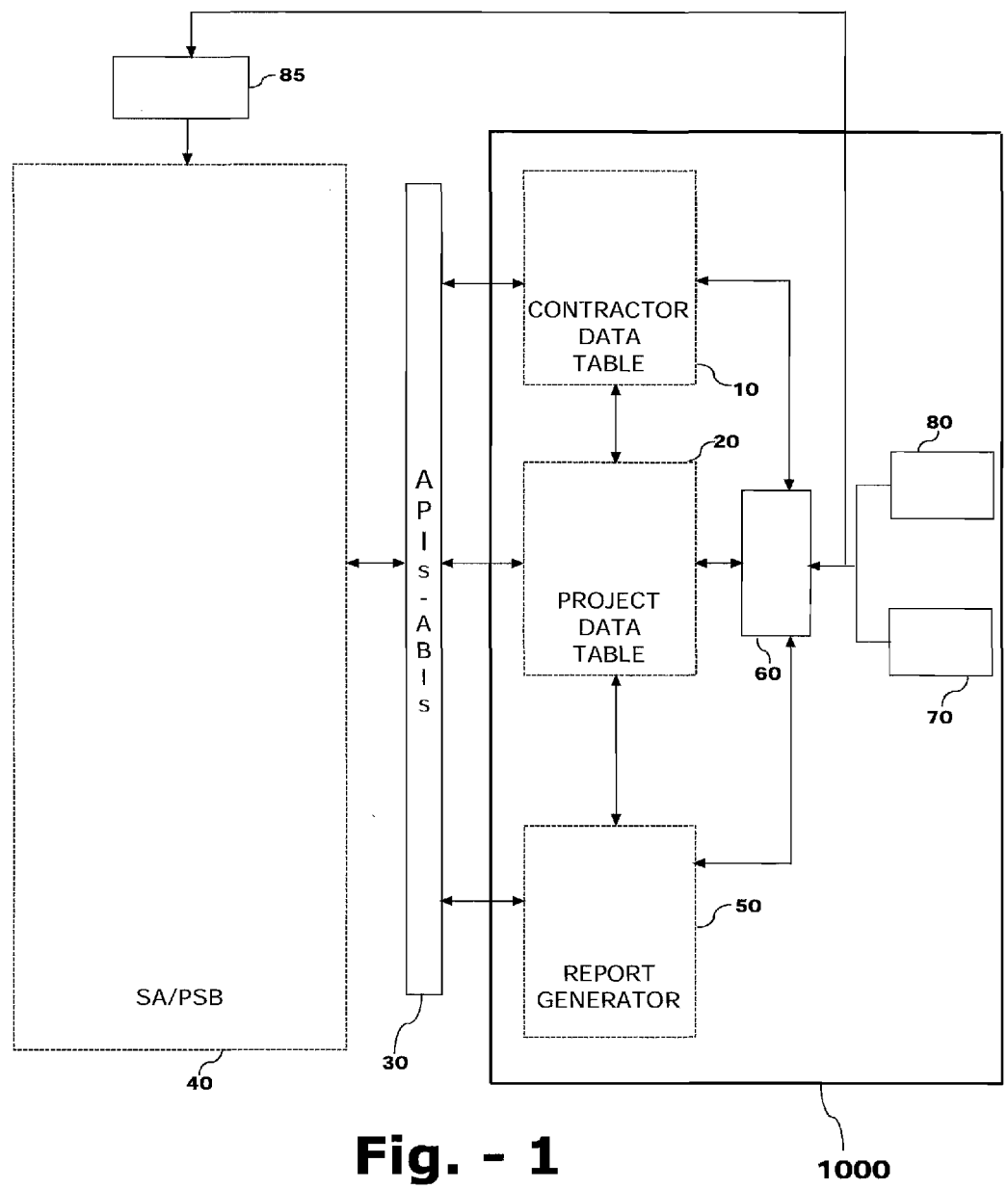
FIG. 1 is a top-tier process flow diagram showing the relationship between Contractor-specific information, Project-specific information generated through Applicant's invention and a Payroll Service Bureau core payroll processing engine (PSB) or Stand Alone core payroll processing engine (SA)

As seen in FIG. 1, Applicant's preferred embodiment Public Works contractor payroll processing and reporting system 1000 relies on information carried in a variety of tables. Essential tables include by example contractor table 10 which carries the various information pertaining to that Contractor or otherwise in the case of the PSB, client or contractor. Project table 20 carries the pertinent information for any given project and distinguishes between private sector or Public Works projects by virtue of the information contained therein.

As is usual, as previously described in this disclosure, when information sharing between programs or systems is required, a version, or versions, of programming abstractions known as an Application Programming Interface (hereinafter "API") or Application Binary Interface (hereinafter "ABI") must be developed. As shown in FIG. 1, API's/ABI's 30 acts as the conduit of information between at a minimum tables 10 and 20, and more depending on the extent of tables the user wishes to employ, or must employ in order to conform with jurisdiction-specific payroll and Public Works processing and reporting rules, in Public Works contractor payroll processing and reporting system present invention 1000, and the separate core payroll processing capable system "Stand Alone payroll processing engine" or "Payroll Service Bureau payroll processing engine" SA/PSB 40. The API's/ABI's abstractions disclosed herein could be direct or web connection based.

Those in the art will understand that a "Stand Alone payroll processing engine" can comprise one computer or a group of several computers all functioning as a payroll processing system. And further, those in the art will understand that a "Payroll Service Bureau payroll processing engine" can comprise a single computer server or several computer servers, workstations, and other data processing and storage machines working independently or in concert functioning as a computerized payroll processing system. Finally, those in the art will understand that the present invention as represented as Public Works payroll processing and reporting system 1000 on FIG. 1, also could comprise a plurality of data processing and data storage machines or media working together as one system.

API's/ABI's 30 interfaces with SA/PSB 40 which has its own report generator (not shown). An overall report generator 50 is also capable of generating reports equivalent to those which may be produced by SA/PSB 40, by virtue of sourcing the reportable information through API's/ABI's 30 is shown with its data flow paths.

For Public Works construction project payroll which is governed by "prevailing wage" laws, there are at least four critical elements of "raw" related data input required for each employee payroll which is to be processed. These are; worker, project, time worked (broken down hourly per day), and by classification of work. The input means and path of raw payroll data depends on the capacity and configuration of SA/PSB 40. If SA/PSB 40, through it's existing data input means (not shown), can receive all the critical elements of raw data in it's independent capacity, then the utility element of the present invention 1000 to receive the raw data for processing (as well as transmission in part through API's/ABI's 30 into the core payroll processing system) may remain unutilized. In that case, the present invention 1000 system can receive the necessary raw data through the API's/ABI's 30 and both verify as acceptable, and incorporate it into it's augmenting and supporting process. If, the raw data entering through SA/PSB 40 is not deemed acceptable by the process in present invention 1000, an alert can occur to signal the unacceptability so correction may be made. However, if SA/PSB 40 is not able to receive the critical raw payroll input data in such a way that it may be transmitted properly into the present invention 1000 through API's/ABI's 30, or, if the user determines it is a preferred configuration to have the raw data brought in through present invention 1000, then interface 60 may be provided to accept information from some sort of time record, including but not limited to a time sheet 70 by means of data entry device computer keyboard and mouse 80 which may be connected to the system directly, wirelessly in a local area network, or through the interne. A third alternative raw data input path is data entry device 80 which may also be linked in a more direct way with SA/PSB 40, depending, as stated above, on it's configuration and capacity, through API/ABI 85. Other means for inputting data via interface 60 into the system and therefore also SA/PSB 40 if desired include wireless time recorders currently in use in the field, handheld PDA's with appropriate software and either wired or wireless capabilities and other data entry methods commonly employed in the field.

In the case of raw data input which enters the system through interfaces 80, 70, and 60 and subsequently is further processed and stored in tables 10 and 20, data may subsequently flow directly from tables 10 and/or 20 through API's/ABI's 30 to SA/PSB 40. Processing of the data can then occur in the core payroll system. Core payroll process SA/PSB 40 resulting data can flow back to tables 10, 20, and report generator 50, as well as to all other tables, modules, stores, interfaces, and other components of present invention 1000 in order that elements of the core payroll process can be combined with elements of the present invention 1000 process to create, for example, CPR's which comprehensively satisfy the CPR-criteria requirements under the jurisdiction in which the project happens to be.

Figure 2:
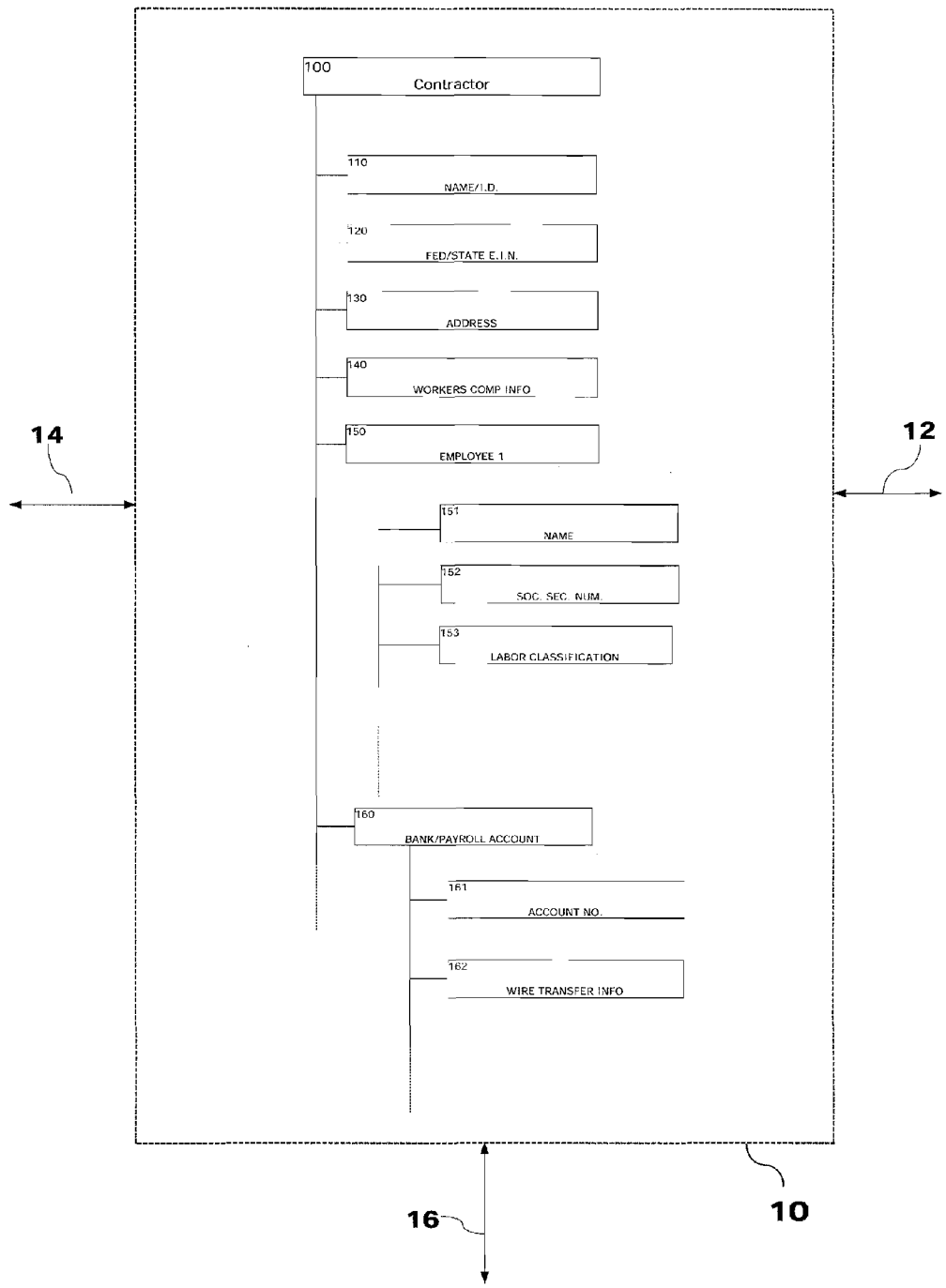
FIG. 2 is a process flow diagram of the Contractor-specific information in FIG. 1, with added detail.

FIG. 2 depicts the typical informational field structure for a relational table primarily housing contractor or client information. Contractor table 10 comprises a heading 100 which can be identified for updating or sourcing of information by means of API's/ABI's 30 or other relevant tables, such as table 20. Typical entries of information include name/identification number 110, taxpayer number 120, address 130, worker's compensation policy information 140, and employee information such as a first employee entry 150 and its associated information such as name 151, social security number 152, labor classification(s) 153, weekly wage guarantee (if applicable) 154, and so forth, providing all pertinent information needed for that employee such that adequate calculations of various payroll criteria may be shared and accessed through API's/ABI's 30 by SA/PSB 40 such that appropriate CPRs and standard financial and project management related reports may be generated and actions taken to withhold, pay, disburse, deposit and otherwise treat and process core payroll.

Data flow path 12 may provide information via interface 60 unless said information is uploaded into table 10 via data flow path 14, which may transmit information from SA/PSB 40 (not shown) via API's/ABI's 30 (also not shown).

Hence, Applicant's invention provides that information may be input into all relational tables as shown in FIG. 1, tables 10 and 20 via, for example, data entry means 80 through interface 60 or, by virtue of using predetermined table field names compatible or recognized by API's/ABI's 30, may be uploaded or sourced from any existing SA/PSB 40 tables or data fields. Therefore, the transfer or entry of data may be accomplished on either side of API's/ABI's 30; i.e., through Applicant's system or through the SA/PSB. Each table and the report generator has data paths allowing the exchange of such information either through API's/ABI's 30 or via interface 60.

Also contained in table 10 is contractor/client bank information 160 including account numbers 161, wire transfer information 162 etc. Although SA/PSB 40 generally processes and stores this particular data, it is an element of payroll record CPR-criteria critical to most, if not all jurisdiction CPR rules and depending on the capability and difficulty of capturing the discrete data from SA/PSB 40 by Report Generator 50, this portion of the data store table may be utilized in redundant data-sharing and storing fashion.

Figure 3:
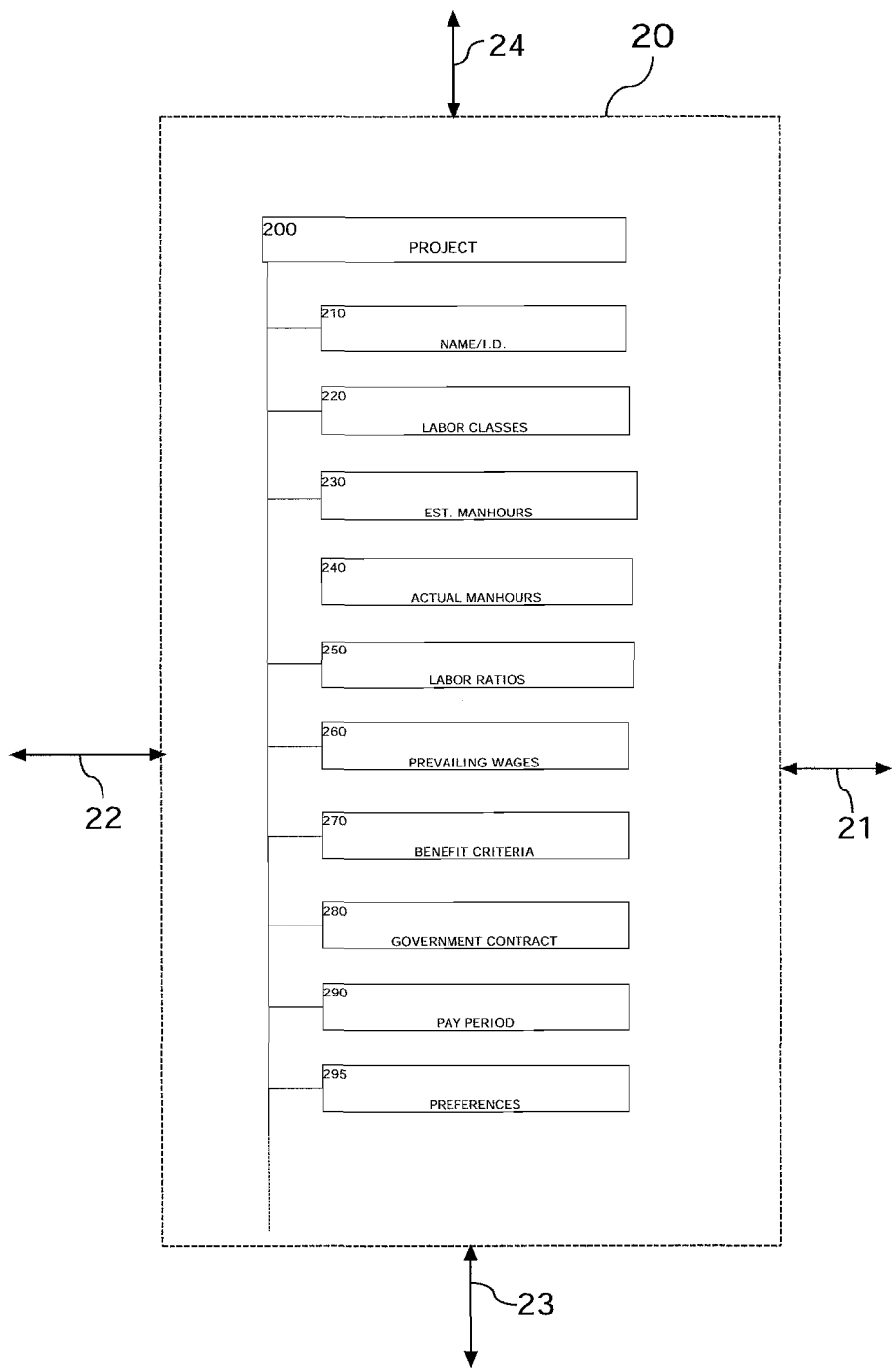
FIG. 3 is a process flow diagram showing the variable Project-specific information of FIG. 1 with added detail and information flow to the diagrams of FIGS. 2 and 3.

FIG. 3 depicts a typical project table 20 with again data flow paths 21, 22, 23 and 24 (aka line 16 in FIG. 2) titled with a table name 200 (in this case "Project") and carrying relevant information fields such as: name or identification number 210; labor classifications 220; estimated man hours 230 (broken down by labor classification typically) to be expended or applied; and a field which may be updated with actual man hours 240, reported via time sheet 70 on an individual employee basis in hourly or subhourly increments grouped on a daily basis and further grouped by work classification; threshold labor classification ratios 250 (primarily journeyman and apprentice classifications for each craft type); prevailing wage information 260 (which may also be contained in subfields of for example, labor class 220); as also may be project specific fringe benefit element 270; a field containing identification as a government contract 280; predetermined pay period 290; a field for various government preferences 295, which may include small business, disabled veteran, minority, women-owned preferences, ADA or other preferences; and further including other information specific to said project which will typically be transmitted through data flow path 22 to API's/ABI's 30 and thereby SA/PSB 40 for appropriate calculations in the above-mentioned core payroll processing functions, and at contractor's discretion, may be directly used by applicant's system for direct generation of customized reports. As in the case of the other relational tables, data flow path 21 may carry input information from interface 60 (not shown) to table 20, and a data flow path 23 may be provided to interchange data between report generator 50 as more particularly shown in FIG. 4. Data flow path 24, shown as data flow path 16 on FIG. 2 may carry data between the Contractor group of data stores 10 and Project group of data stores 20 to further treat data which may then be transmitted to the report generator 50 through data flow path 23.

If data exists in field 280, then the SA/PSB 40 treats the project as a Public Works project and performs contractor desired comparisons to generate useful reports as described above, and in addition, produces Certified Payroll Reports or "CPR's" as required by the appropriate jurisdiction. If field 280 is void of data, then the CPR does not generate, thus preventing general information clutter, saving paper, and/or digital memory when payroll for an employee working on a project which does not require a CPR is processed.

Figure 4:
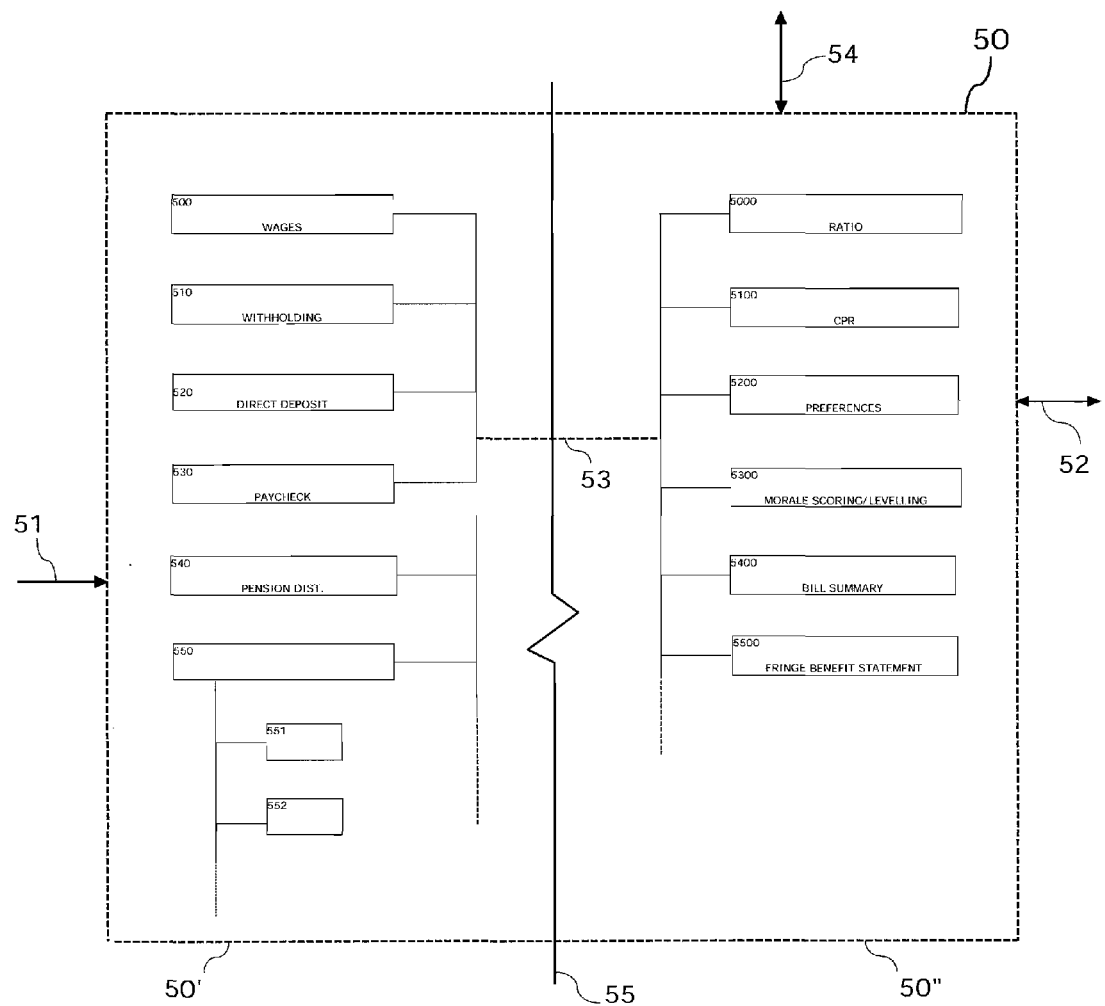
FIG. 4 is a process flow showing the flow of information into the Report Generator.

FIG. 4 depicts report generator 50, bifurcated by Line 55 into two interconnected subparts, the relationships of each further described below. Report generator 50 receives information from SA/PSB 40 via API's/ABI's 30 and data path 51. Data path 52 allows for communication between report generator 50 and interface 60 thereby providing for fully integrated data processing as specifically needed for specialized or custom report generation. Data path 54 similarly interconnects component 20 to 50. Thus, integration of the system allows for efficient data processing according to specific requirements which may be slightly or even substantially different case by case during the particular core payroll processing then occurring.

Line 55 represents a separation between report generators 50' and 50". Report generator 50' is comprised of the standardized core payroll reporting independently caused by the SA/PSB 40. These reports, generally financial in nature, would be generated without augmentation or communication with Applicant's invention. Therefore, in the example and preferred embodiment described herein, reports 500 et. al. are redundant data stores containing the precise report generation data resulting from the core payroll process. To avoid duplication of report generation of this information the actual creation of some or all of reports 500 et. al. may be in inactivated. Generator 50" represents the portion of report generator 50 which provides customized reports 5000 et al., including but not limited to labor class ratios (apprentices as a function of journeymen) 5000, the all-important certified payroll report 5100, preference report 5200 showing performance against contractor established goals for comparison with governmental hiring objectives, manpower leveling report 5300, which may aid contractor in assuring fair work allocation among its employees, billing summary report 5400 which allows the user to monitor the time quantity based cost of payroll processing (e.g. an amount-per-hour of each worker's time which is processed for payroll) and aids in recovering costs where contractually allowed (e.g. "Time and material" type change order increases to original scope of work in contract or subcontract), and fringe benefit statement 5500 which details fringe benefit trust funds, or other accounts, utilized by the contractor. Data path 53 is represented as crossing bifurcation line 55 such that required data of the core payroll process, redundantly stored in the 50' sector, may be integrated into the 50" reports generation process. Data paths 52 and 54 may, in unison or individually, allow for relevant data, which may or may not be redundantly available from SA/PSB 40 through API's/ABI's 30, to be incorporated into the 50' tables for efficient processing and production of reports such as CPRs with the precise CPR-criteria required for the individual project under the individual jurisdiction rules.

In the preferred embodiment, Applicant's inclusion of relational tables containing project and contractor specific information, capable of being shared with a PSB or SA core payroll data processing system such that standard as well as custom or certified reports may be generated, constitutes a significant step forward in the capability to generate government required certified prevailing wage reports for the small, medium and even large government Public Works or mixed Public Works and privately funded project contractor, with additional proactive project management capabilities, all at reasonable and predictable cost which can be estimated accurately by the contractor during their pre-bid analysis of the cost to complete a given project and thereby add the payroll processing cost in to the estimate and bid amount.

While the invention has been described in connection with what is presently considered the most practical and preferred embodiment(s), it is to be understood that the invention is not limited to the disclosed embodiment(s) but, on the contrary is intended to cover various modifications and equivalent arrangements included within the scope of the appended claims.

What is claimed is:

1. A method of public works construction payroll processing for a contractor comprising:
    processing payroll related data with a computer implemented core payroll calculation and processing engine, the processing including:
        sharing between conjoined computer processor components, input data stored in a relational database, said input data required for core payroll processing and calculation, said input data also required for production of at least one certifiable public works construction payroll record report (CPR), the CPR defined in accordance with jurisdiction-specific rules drawn from a plurality of stored rules;
        distinguishing between public works projects and private sector projects based on the input data and identifying the project as a public works project based on the input data;
        verifying input data is compliant with requirements of the core payroll processing and calculation engine and the requirements of the CPR;
        processing the verified input data to produce calculated core payroll data, the calculated core payroll data used for core payroll processing, production of core payroll processing reports, and production of the CPR;
        sharing, between conjoined computer processor components, the calculated core payroll data;
        sharing, between the conjoined computer processor components, non-calculated payroll related data as required for production of the CPR;
        storing the non-calculated payroll related data and the calculated core payroll data redundantly or individually;
        producing the CPR based on the calculated core payroll data and the non-calculated payroll related data only if the input data identifies the project as a public works project, the CPR produced in conjunction with and simultaneously with core payroll processing; and
        producing public works contractor management supporting reports using the input data only if the input data identifies the project as a public works project, the public works contractor management supporting reports indicating whether the contractor is in compliance with the jurisdiction-specific rules of a jurisdiction to which the public works construction contractor is subject.

2. The method of claim 1, further comprising completing the CPR after completing the core payroll processing and further comprising submitting the CPR to the jurisdiction to which the public works construction contractor is subject, wherein the production of the CPR is in accordance with format and element requirements of the jurisdiction to which the public works construction contractor is subject.

3. The method of claim 1 wherein the public works contractor management supporting reports include payroll processing billing reports that are generated based on payroll hours processed.

4. The method of claim 1, wherein the input data includes accrued individual employee time or wages earned for work done on public works projects and privately funded projects along with an associated score for use in allocating future work to employees.

5. The method of claim 1, further comprising generating classification and project specific reports for determining and stating proper submission of contributions to training funds.

6. The method of claim 1, further comprising generating multi-project based records of compliance with public works prevailing wage and apprenticeship related laws and regulations.

7. The method of claim 1, further comprising generating management supporting reports based on a combination of input data elements including two or more input data elements selected from the group consisting of wages, hours, projects, employees, apprentices, and classifications of work.

8. The method of claim 1, further comprising processing payroll simultaneously under rules of a plurality of public works project awarding body jurisdictions and rules of a plurality of privately funded project jurisdictions.

9. The method of claim 1 wherein the input data includes data stored in a contractor table and a project table of a relational database, and wherein identifying the project as a public works project is based on the input data included in the project table.

10. The method of claim 1 wherein the step of processing the verified input data to produce calculated core payroll data occurs in conjunction with the step of producing the CPR.

11. The method of claim 1 wherein the input data includes accrued journeyman hours and apprentice hours on a per-classification and per-project basis, the public works contractor management supporting reports include the accrued journeyman hours and apprentice hours in comparison with initial or adjusted estimates of journeyman hours and apprentice hours, and the public works contractor management supporting reports are produced prior to (i) core payroll processing, (ii) production of core payroll processing reports, and (iii) the production of the CPR, and indicate whether the public works construction contractor is on schedule to be in compliance with the jurisdiction-specific rules of a jurisdiction to which the contractor is subject.

12. A system for public works construction contractor payroll processing comprising:
a computer processor, or a networked plurality of computer processors, configured with:
computer readable instructions;
at least one data base application;
at least one user interface;
binary and application programming interfaces;
a core payroll calculation and processing engine configured to perform payroll calculation and processing and produce calculated core payroll data; and
an augmentation and supporting engine for public works payroll processing operating in conjunction with the core payroll calculation and processing engine and configured to produce certifiable public works payroll records and reports in conjunction with and simultaneously with the payroll calculation and processing performed by the core payroll calculation and processing engine, the augmentation and supporting engine including a plurality of relational tables, at least one relational table configured to distinguish between private sector and public works projects, the augmentation and supporting engine configured to receive the calculated core payroll data and use the calculated core payroll data in the production of the certifiable public works payroll records, wherein the augmentation and supporting engine is configured to produce the certifiable public works payroll records and reports for a project only if the at least one relational table identifies the project as one of the public works projects, the certifiable public works payroll records and reports for the project produced in accordance with jurisdiction-specific rules drawn from a plurality of stored rules.

13. The system of claim 12, in which the augmenting and supporting engine for public works payroll processing is provided on a first of the networked plurality of computer processors and is connected through an interface to the core payroll calculation and processing engine provided on a second of the networked plurality of computer processors.

14. The system of claim 12, in which the augmenting and supporting engine for public works payroll processing is integrally joined with the core payroll calculation and processing engine to provide a monolithic public works payroll processing system wherein the core payroll calculation and processing engine operates simultaneously with the supporting engine for public works payroll processing such that the certifiable public works payroll records and reports are produced simultaneously with payroll calculation and processing.

15. The system of claim 12, in which the augmenting and supporting engine for public works payroll processing is comprised of a plurality of independent processing modules connected by a plurality of interfaces to the core payroll calculation and processing engine.

16. The system of claim 12, wherein discrete portions of an aggregate whole system are established, maintained, and performed in:
a core payroll system;
the augmentation and supporting engine for public works payroll processing;
an end-user portion of the system;
independently in separate computing systems; or,
in combination of separate computing systems in any apportionment.

17. The system of claim 12, the plurality of relational tables including a contractor table and a project table, the project table configured to distinguish between private sector and public works projects.

18. The system of claim 12, wherein the augmentation and supporting engine is further operable to produce public works contractor management supporting reports produced prior to payroll calculation and processing, the public works contractor management supporting reports indicating whether a public works contractor is on schedule to be in compliance with the jurisdiction-specific rules of a jurisdiction to which the public works construction contractor is subject.

19. The system of claim 18, the public works contractor management supporting reports including accrued journeyman hours and apprentice hours in comparison initial or adjusted estimates of journeyman hours and apprentice hours in order to indicate whether the public works contractor is in compliance with the jurisdiction-specific rules of a jurisdiction to which the public works construction contractor is subject.

20. A method of public works payroll processing comprising:
- storing contractor data for a contractor involved with a project in a contractor table of a relational database, said contractor data including employee information for a plurality of employees employed by the contractor;
- storing project data related to the project in a project table of the relational database, said project data including man-hours for each of the plurality of employees and government contract data, the man-hours for each of the plurality of employees provided on a project-specific basis, classification-specific basis, and date-specific basis;
- storing payroll processing criteria in a database, said payroll processing criteria including jurisdiction-specific payroll requirement data associated with a plurality of jurisdictions, the plurality of jurisdictions including a jurisdiction associated with the public works project;
- distinguishing between public works projects and private sector projects based on the project data in the project table of the relational database and identifying the project as a public works project based on the project data;
- performing core payroll calculation and processing by a core payroll calculation and processing engine based at least in part on the contractor data, the project data, and the payroll processing criteria; and
- generating reports with an augmentation and supporting engine based on said contractor data, said project data, and said payroll processing criteria, said reports produced in conjunction with and simultaneously with the core payroll calculation and processing, and said reports including certified payroll records for the public works project, the certified payroll records compliant with requirements of the jurisdiction associated with the public works project.

21. The method of claim 20 wherein said employee information includes at least one labor classification for each employee, said project data includes labor classification ratios based on said man-hours for each employee and said at least one labor classification for each employee, and said reports include project-specific labor classification ratio reports.

22. The method of claim 21 wherein said labor classification ratio reports indicate current or impending compliance vulnerability with respect to one of the plurality of jurisdictions and the associated jurisdiction-specific payroll requirement data.

23. The method of claim 21 wherein said labor classification ratios of said project data include apprentice-journeyman ratios.

24. The method of claim 20, the project data further including initial or adjusted estimates of journeyman hours and apprentice hours, and the man-hours further including accrued journeyman hours and accrued apprentice hours, said reports further including real-time management supporting reports comparing the accrued journeyman hours and accrued apprentice hours with the initial or adjusted estimates of journeyman hours and apprentice hours, the real-time management supporting reports produced prior to the certified payroll records.

* * * * *